Dec. 3, 1946.                G. E. DATH                2,411,956
FRICTION SHOCK ABSORBING MECHANISM
Filed June 6, 1945
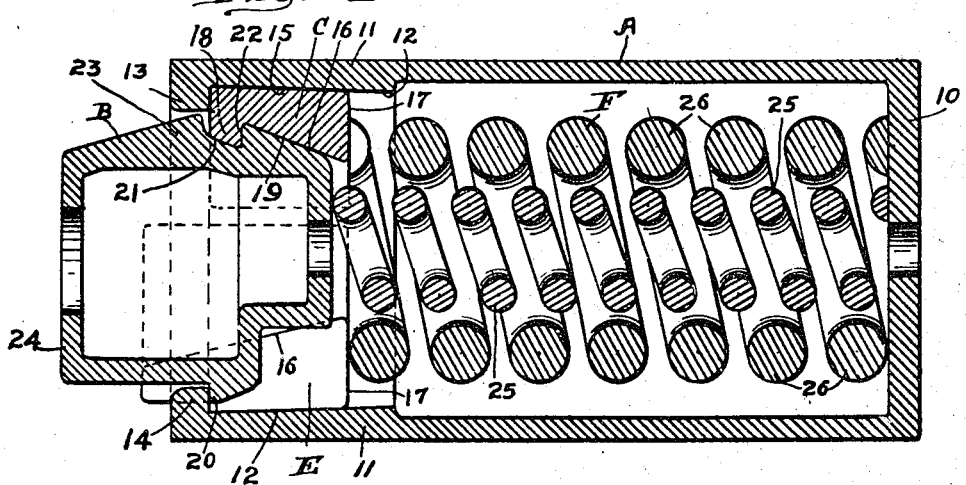
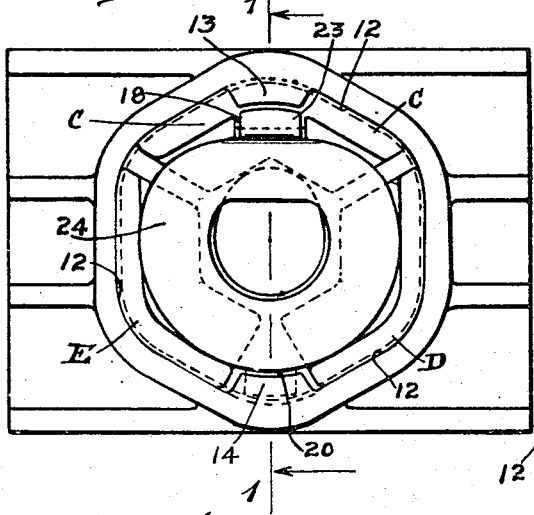
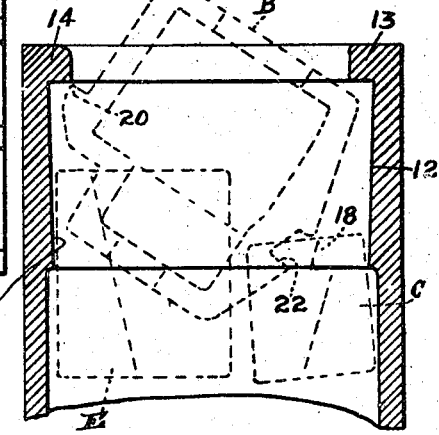
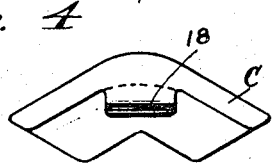
Inventor:
George E. Dath.
By Henry Fuchs.
Atty.

Patented Dec. 3, 1946

2,411,956

UNITED STATES PATENT OFFICE 2,411,956

FRICTION SHOCK ABSORBING MECHANISM

George E. Dath, Mokena, Ill., assignor to W. H. Miner, Inc., Chicago, Ill., a corporation of Delaware Application June 6, 1945, Serial No. 597,811

5 Claims. (Cl. 267—9)

This invention relates to improvements in friction shock absorbing mechanisms.

One object of the invention is to provide a friction shock absorbing mechanism comprising a friction casing and a spring resisted friction clutch including a wedge block and friction shoes telescoped within the casing for sliding frictional engagement therewith, wherein one of the shoes has shouldered engagement with the casing to limit outward movement of the same and the wedge has shouldered engagement with the casing and said shoe to limit outward movement of the wedge and hold the mechanism assembled.

A further object of the invention is to provide in a friction shock absorbing mechanism including a friction casing of hexagonal, transverse cross section, open at its front end and closed by a permanent wall at its rear end, a central wedge block adapted to receive the actuating force; a plurality of friction shoes surrounding the wedge block and having wedging engagement therewith; and a spring resistance within the casing yieldingly opposing inward movement of the shoes, all insertable within the casing through the open front end thereof, a retaining arrangement for the wedge block, utilizing inturned lugs on the casing at the open end thereof, whereby a passage of ample size to admit the maximum diameter spring which may be accommodated in the hexagonal casing is provided between the lugs of the casing, thereby making possible the use of a relatively heavy spring resistance with correspondingly increased shock absorbing capacity of the mechanism.

A further object of the invention is to provide a friction shock absorbing mechanism including a friction casing open at one end, friction shoes slidable within the open end of the casing, a central wedge block in wedging engagement with the shoes, and spring resistance means yieldingly opposing inward movement of the shoes, wherein the wedge is limited in its outward movement and anchored to the casing by providing shouldered engagement between the wedge and the casing and between the wedge and one of the shoes at diametrically opposite sides of the mechanism, and restricting outward movement of said last named shoe by shouldered engagement with the casing.

A more specific object of the invention is to provide a friction shock absorbing mechanism including a friction casing of hexagonal, interior cross section, closed at one end and open at the other end; a friction clutch slidingly telescoped within the open end of the casing including a central wedge block and friction shoes surrounding the block; spring means within the casing yieldingly opposing inward movement of the clutch; and a retaining means for the clutch including inturned lugs at the open end of the casing with which the clutch has shouldered engagement, wherein the lugs are disposed at diametrically opposite corners of the hexagonal casing and are respectively engaged by the outer end of one of said shoes and a lug on said wedge, and wherein the wedge and said last named shoe have shouldered engagement with each other for anchoring the wedge to said last named shoe, the lug of the wedge and the shoulder of the same being respectively engageable in back of the co-operating lug of the casing and the shoulder of the shoe by inserting the wedge within the casing while in tilted position, thus permitting the use of lugs on the casing having minimum projection into the opening of the same, thereby making possible the use of the maximum diameter spring which may be accommodated in said hexagonal casing.

Other objects of the invention will more clearly appear from the description and claims hereinafter following.

In the drawing forming a part of this specification, Figure 1 is a longitudinal, vertical sectional view of my improved friction shock absorbing mechanism, said view corresponding substantially to the line 1—1 of Figure 2. Figure 2 is a front elevational view of Figure 1. Figure 3 is a view similar to Figure 1, partly broken away, with the friction casing set on end, illustrating the manner of assembling the wedge with the casing and shoes, the wedge and shoes being shown in dotted lines and the spring resistance being omitted. Figure 4 is a front elevational view of the friction shoe located at the upper side of the casing, as seen in Figures 1 and 2 and looking from left to right in Figure 1.

My improved friction shock absorbing mechanism, as shown, comprises broadly a casing A; a wedge block B; three friction shoes C, D, and E; and a spring resistance F.

The casing A is in the form of a hexagonal, tubular member closed at its rear end by a vertical, transverse wall 10, which is extended laterally beyond the casing to provide the usual integral rear follower member. At the forward or open end thereof, the casing A has the walls thereof inwardly thickened to provide the friction shell section proper 11 of the casing. The friction shell section of the casing presents three interior friction surfaces 12—12—12 which converge rearwardly of the mechanism and are of V-shaped, transverse cross section. The casing A is provided with diametrical, oppositely disposed, inturned stop lugs 13 and 14 at the open end thereof, which lugs are at diametrically opposite corners of the casing. The lug 13, as shown in Figures 1 and 2, is located at the top side of the casing between the diverging sections of the top V-shaped friction surface 12. The lug 14, as seen in Figures 1 and 2, is located at the bottom side of the casing between the two adjacent V-shaped friction surfaces at said bottom side.

The friction shoes C, D, and E are of similar design, except as hereinafter pointed out. Each shoe has a V-shaped friction surface 15 on the outer side thereof which slidingly engages with the corresponding V-shaped friction surface 12 of the casing A. On the inner side, each shoe has a V-shaped wedge face 16 which is engaged by the wedge block B. The three shoes have transverse, rear abutment faces 17—17—17 on which the spring resistance of the mechanism bears. At the forward end thereof, that is, forwardly of the wedge face 16, the shoe C is provided with a laterally inwardly projecting stop lug 18. As clearly shown in the drawing, the shoe C is considerably shorter than the shoes D and E and shoulders at its front end against the lug 13 of the casing.

The wedge B is in the form of a hollow block having three inwardly converging, V-shaped wedge faces 19—19—19 at the inner end thereof, which are arranged symmetrically about the central longitudinal axis of the mechanism. At one side thereof, the block B has a radial stop lug 20 which engages in back of the lug 14 of the casing A. At the side thereof, diametrically opposite to the lug 20, the wedge block B is cut out, or recessed, as indicated at 21, said recess being located at the front end of the wedge face 19 at the corresponding side of the block and provides a transverse, forwardly facing abutment shoulder 22 engageable in back of the lug 18 of the shoe C. The block B is preferably reenforced outwardly beyond the shoulder 22 by a lengthwise extending web or rib 23, which is tapered forwardly. The inner end of the web 23 overhangs the recess 21 of the block. At the forward end, the wedge block B presents a flat, transverse face 24 which is adapted to bear on the usual front follower of the railway draft rigging.

The spring resistance F, which is disposed within the casing A, comprises a relatively light inner coil 25 and a heavier outer coil 26. The spring coils 25 and 26 have their rear ends bearing on the transverse end wall 10 of the casing A. The front ends of the spring coils 25 and 26 bear respectively on the inner end of the wedge block B and the inner ends of the shoes C, D, and E. In the assembled condition of the mechanism, the spring resistance F is preferably under initial compression.

In assembling the mechanism, the friction casing is set on end, that is, in upright position, as shown in Figure 3, and the spring resistance F and the three shoes C, D, and E placed within the casing with the shoes resting upon the spring resistance in spread apart condition, the shoe C being disposed in back of the lug 13 of the casing A. The shoes are then forced inwardly to approximately the dotted line position shown in Figure 3 by means of any suitable tool engaged with the front ends of the shoes, and held in that position during further assembling of the mechanism.

While thus held by the tool, the wedge block B is inserted within the casing in the tilted position shown in Figure 3, the lug 20 of the wedge block being brought in back of the lug 14 of the casing and the shoulder 22 in back of the lug 18 of the shoe C. The holding tool is then removed, permitting the spring resistance to expand and force the shoes C, D, and E outwardly, thus righting the wedge and interlocking the lug 20 thereof with the lug 14 of the casing and the shoulder 22 with the lug 18 of the shoe C and bringing the parts to the full release position of the mechanism shown in Figure 1, with the shoe C shouldered against the lug 13 of the casing.

The operation of my improved friction shock absorbing mechanism is as follows: Upon compression of the mechanism, the wedge block B is forced inwardly of the casing, thereby spreading the shoes apart and sliding the same inwardly along the friction surfaces of the casing, thus producing high frictional resistance to absorb the shock. Upon the actuating force being removed, the expansive action of the spring resistance F forces all of the parts outwardly, outward movement of the wedge block B being limited by engagement of the lug 20 thereof with the lug 14 of the casing and the shoulder 22 thereof with the lug 18 of the shoe C, which shoe, in turn, has its outward movement limited by engagement with the lug 13 of the casing.

I claim:

1. In a friction shock absorbing mechanism, the combination with a friction casing; of a plurality of friction shoes slidable within the casing, one of said shoes having shouldered engagement with the casing to limit outward movement of said shoe; a spring resistance yieldingly opposing inward movement of said shoes; and a central wedge block having wedging engagement with said shoes, said block having shouldered engagement with the casing and with the shoe which has shouldered engagement with the casing to limit outward movement of the wedge with respect to the casing and said shoe.

2. In a friction shock absorbing mechanism, the combination with a friction casing; of a plurality of friction shoes slidable within the casing; a spring resistance within the casing opposing inward movement of said shoes; and a central wedge block having wedging engagement with said shoes, said wedge block having shouldered engagement with the casing and one of said shoes at diametrically opposite sides of the mechanism to limit outward movement of the wedge block, said last named shoe, in turn, having shouldered engagement with the casing to limit outward movement of said shoe.

3. In a friction shock absorbing mechanism, the combination with a friction casing of hexagonal, transverse cross section, open at one end and presenting three inwardly extending friction surfaces of V-shaped, transverse cross section at said open end; of three friction shoes having V-shaped friction surfaces respectively engaging the V-shaped friction surfaces of the casing, one of said shoes having shouldered engagement with the casing to limit outward movement of said shoe; a spring opposing inward movement of said shoes; and a central wedge block having shouldered engagement with the shoe which has shouldered engagement with the casing to limit outward movement of the block with respect to said shoe, and shouldered engagement with the casing to limit outward movement of the wedge block with respect to the casing, said shouldered engagement of the wedge and said shoe with the casing being at diametrically opposite sides of the mechanism.

4. In a friction shock absorbing mechanism, the combination with a friction casing of hexagonal, transverse cross section open at one end and having inwardly extending friction surfaces at said open end of V-shaped, transverse section; of three friction shoes slidingly telescoped within the casing, said shoes having V-shaped friction surfaces engaging with the V-shaped friction surfaces of the casing; a spring within the casing yieldingly opposing inward movement of said shoes; diametrically opposed, inturned lugs at the open end of said casing, one of said shoes having its outward movement limited by shouldered engagement with one of said stop lugs of the casing; a central wedge block having shouldered engagement with the last named shoe to limit outward movement of the wedge with respect to said shoe, said block having wedging engagement with each friction shoe; and a stop lug on said wedge engageable in back of the other stop lug of the casing.

5. In a friction shock absorbing mechanism, the combination with a friction casing of hexagonal, transverse cross section, open at one end and having three inwardly extending friction surfaces at said open end of V-shaped, transverse cross section; of an inturned stop lug at one corner of the casing between two adjacent friction surfaces thereof; a second inturned stop lug on said casing at the diametrically opposite corner thereof; three friction shoes having V-shaped friction surfaces respectively engaging the corresponding friction surfaces of the casing, one of said shoes having shouldered engagement with said second named lug to limit outward movement of said shoe; a spring yieldingly opposing inward movement of said shoes; a central wedge block having wedging engagement with said shoes, said block having shouldered engagement with the shoe which has shouldered engagement with said second named lug to limit outward movement of the block with respect to said shoe; and a retaining projection on said wedge block engageable in back of said first named lug to limit outward movement of the wedge block with respect to the casing.

GEORGE E. DATH.